(12) United States Patent
Lee

(10) Patent No.: US 8,459,949 B2
(45) Date of Patent: Jun. 11, 2013

(54) WIND POWER GENERATION HAVING VARIABLE WINDMILL WINGS

(76) Inventor: In-nam Lee, Namyangju-si (KR)

(*) Notice: Subject to any disclaimer, the term of this patent is extended or adjusted under 35 U.S.C. 154(b) by 199 days.

(21) Appl. No.: 12/776,629

(22) Filed: May 10, 2010

(65) Prior Publication Data

US 2012/0039714 A1 Feb. 16, 2012

(30) Foreign Application Priority Data

Mar. 17, 2010 (KR) ........................ 10-2010-0023951

(51) Int. Cl.
*F03D 3/00* (2006.01)

(52) U.S. Cl.
USPC ................ 416/117; 416/11; 416/41; 415/4.2

(58) Field of Classification Search
USPC .............. 416/40, 41, 117, 118, 119; 415/4.2, 415/4.4, 907
See application file for complete search history.

(56) References Cited

U.S. PATENT DOCUMENTS

| | | | | |
|---|---|---|---|---|
| 1,111,350 A * | 9/1914 | Bayley | ........................... | 416/117 |
| 4,649,284 A * | 3/1987 | Hsech-Pen | ...................... | 290/55 |
| 4,818,180 A * | 4/1989 | Liu | ................................ | 416/117 |
| 5,057,696 A * | 10/1991 | Thomas | .......................... | 290/44 |
| 6,864,597 B1 * | 3/2005 | Ricker | ............................. | 290/55 |
| 7,875,990 B2 * | 1/2011 | Wang et al. | ..................... | 290/43 |

* cited by examiner

*Primary Examiner* — Nathaniel Wiehe
*Assistant Examiner* — Justin Seabe
(74) *Attorney, Agent, or Firm* — Birch, Stewart, Kolasch & Birch, LLP

(57) ABSTRACT

A wind power generator with variable windmill wings, which has an installation mount; a vertical rotating shaft; a bearing; inner wing installation units; support rods; outer wing installation units; support rings; vertical support rods; windmill wings; support units installed on the vertical rotating shaft between the groups of the windmill wings made in the up/down multi-stage fashion, and connected to holders through wires; a power generator installed on the bottom surface of the central portion of the installation mount; windmill wing moving units installed on the vertical rotating shaft above the inner wing installation units to be movable in the up/down direction and fixing displacements of the windmill wings; and a driving device with a worm wheel installed on the bottom end side of the vertical rotating shaft.

8 Claims, 17 Drawing Sheets

WIND POWER GENERATION HAVING VARIABLE WINDMILL WINGS

TECHNICAL FIELD

The present invention relates to a wind power generator, and more particularly to, a wind power generator having variable windmill wings which can fold the windmill wings in the wind opposite direction and unfold the windmill wings in the wind blowing direction so as to minimize the air resistance applied to the windmill wings in the wind opposite direction, thus increasing the power generation efficiency, and which can be easily installed in a plural number even in a narrow space regardless of the installation location, thus maximizing the amount of power generation per unit area and achieving the industrial purpose.

BACKGROUND ART

In general, the recent power generation methods include heat power generation using a large amount of fossil fuels, nuclear power generation using uranium, water power generation using a large-scaled desalination equipment, and so on. As such power generation methods are responsible for the air pollution or global warming, generate radioactive wastes difficult to dispose of, or cause huge environmental destruction, environment-friendly power generation methods demand immediate attention. Research has been actively made on solar power generation and wind power generation which are alternative environment-friendly methods. In particular, the wind power generation using the wind force has been most preferred. More attention needs to be paid to the wind power generation in Korea surrounded by the sea on three sides.

The wind power generation uses the wind which moves the air due to the air density difference. In the conventional wind power generation, as illustrated in FIG. 1, a pillar having a height of over 5 m is fixedly installed, and a propeller-type blade having two or more wings is installed at a top end of the pillar, thus constituting a power generator generating electricity using the rotation of the propeller-type blade. As the propeller-type blade rotates, the power generator generates power. Power generated by the plurality of wind power generators operated as described above is collected, charged in a charger, and used. However, in the conventional wind power generation, when the wind maintains at least a given velocity and the air has a high density, the propeller-type blade can be rotated to change the force of wind to power. In the event of a moderate wind, power generation is impossible. Accordingly, the conventional wind power generator is seldom efficient in remote places as well as city regions in which the direction of the wind is not constant. In addition, the conventional wind power generator is easily damaged by a strong wind, which incurs large maintenance and repair costs. Moreover, there is no economic advantage in terms of the equipment costs.

In order to solve the foregoing problems, Utility-Model Registration No. 0348990 titled by "Propeller for wind power generator" has been disclosed in the Utility-Model Registration Gazette.

According to Utility-Model Registration No. 0348990 titled by "Propeller for wind power generator", as illustrated in FIG. 2, the propeller for the wind power generator includes a main shaft 1 rotated, connected to the power generator, and performing power generation, driving shafts 2 fixed to the main shaft 1 at a right angle, rotating around the main shaft 1 to rotate the main shaft 1, and simultaneously pivoting around shaft lines 4 according to the direction of the wind, and wing plates 3 fixed to both ends of the driving shafts 2, pivoting on the driving shafts 2 according to the direction of the wind, and unfolded and folded around the shaft lines 4 of the driving shafts 2 by the wind, wherein a support bracket 5 integrally fixed to the main shaft 1, rotated with the main shaft 1, and pivotably fixing the driving shaft 2 is fixed to a top end of the main shaft 1, and gap maintaining parts 6 are formed on the lateral sides of the support bracket 5 to outwardly extend in the horizontal direction. As the one-side wing plates 3 are unfolded and the other-side wing plates 3 are folded according to the direction of the wind, the wind power generator can operate even by a gentle wind having a low velocity.

However, although Utility-Model Registration No. 0348990 titled by "Propeller for wind power generator" suggests the wing plates 3 unfolded or folded by the blowing wind, since the wing plates 3 are unfolded or folded after 90° movement, they may not be normally unfolded or folded. In addition, a plurality of wing plates 3 cannot be installed on the driving shaft 2 with the wing plate 3 thereon, so that the power generation efficiency is not high.

DISCLOSURE

[Technical Problem]

Therefore, the present invention has been made to solve various shortcomings and problems associated with the conventional general wind power generator, and an object of the present invention is to provide a wind power generator having variable windmill wings which can operate by a gentle wind having a low velocity regardless of the direction of the wind, thus increasing the power generation efficiency.

Another object of the present invention is to provide a wind power generator having variable windmill wings which can fold the windmill wings in the wind opposite direction and unfold the windmill wings in the wind blowing direction so as to minimize a resistance force exerted on a rotary force of a windmill shaft, thus increasing the power generation efficiency.

A further object of the present invention is to provide a wind power generator having variable windmill wings which can simplify the manufacturing process by the simple structure and be installed in a plural number in various places regardless of the installation location, thus maximizing the amount of power generation per unit area, achieving the industrial purpose, and generating electricity in the environment-friendly fashion without causing pollution such as greenhouse gas.

[Technical Solution]

According to an aspect of the present invention for achieving the above objects of the present invention, there is provided a wind power generator having variable windmill wings, which includes: an installation mount stood on the floor in the shape of a cross and having a vertical rotating shaft holder in a central portion thereof; a vertical rotating shaft rotatably installed in the central portion of the installation mount; a bearing into which a top end of the vertical rotating shaft is rotatably inserted; '['-shaped holders connected and fixed between the bearing and the installation mount; a plurality of inner wing installation units fixedly installed on the vertical rotating shaft at given intervals in the up/down direction; support rods having one-side ends fixed to the inner wing installation units; a plurality of outer wing installation units to which outer ends of the support rods are fixed; support rings made of a steel wire and connected to the outer wing installation units on the same plane; vertical support rods made of a steel wire and connecting the outer wing installation units of the same group in the up/down direction, the upper and lower outer wing installation units being grouped in the up/down multi-stage fashion; windmill wings installed between the inner wing installation units and the outer wing installation units in the up/down multi-stage fashion; support units installed on the vertical rotating shaft between the groups of the windmill wings made in the up/down multi-stage fashion, and connected to the T-shaped holders through wires; power generation means installed on the bottom surface of the central portion of the installation mount; windmill wing fixing means installed on the vertical rotating shaft above the inner wing installation units to be movable in the up/down direction and fixing displacements of the windmill wings; and fixing means driving device installed on the bottom end side of the vertical rotating shaft.

[Advantageous Effects]

According to the present invention, the wind power generator having the variable windmill wings can operate by a gentle wind having a low velocity regardless of the direction of the wind, thus increasing the power generation efficiency. In addition, the wind power generator having the variable windmill wings can fold the windmill wings in the wind opposite direction and unfold the windmill wings in the wind blowing direction so as to minimize a resistance force exerted on a rotary force of a windmill shaft, thus increasing the power generation efficiency. Moreover, the wind power generator having the variable windmill wings can simplify the manufacturing process by the simple structure and be installed in a plural number in various places regardless of the installation location, thus maximizing the amount of power generation per unit area, achieving the industrial purpose, and generating electricity in the environment-friendly fashion without causing pollution such as greenhouse gas.

Figure 1:
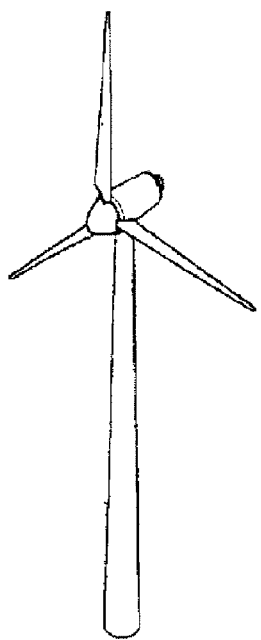
FIG. 1 is a perspective view of a general conventional wind power generator.
Figure 2:
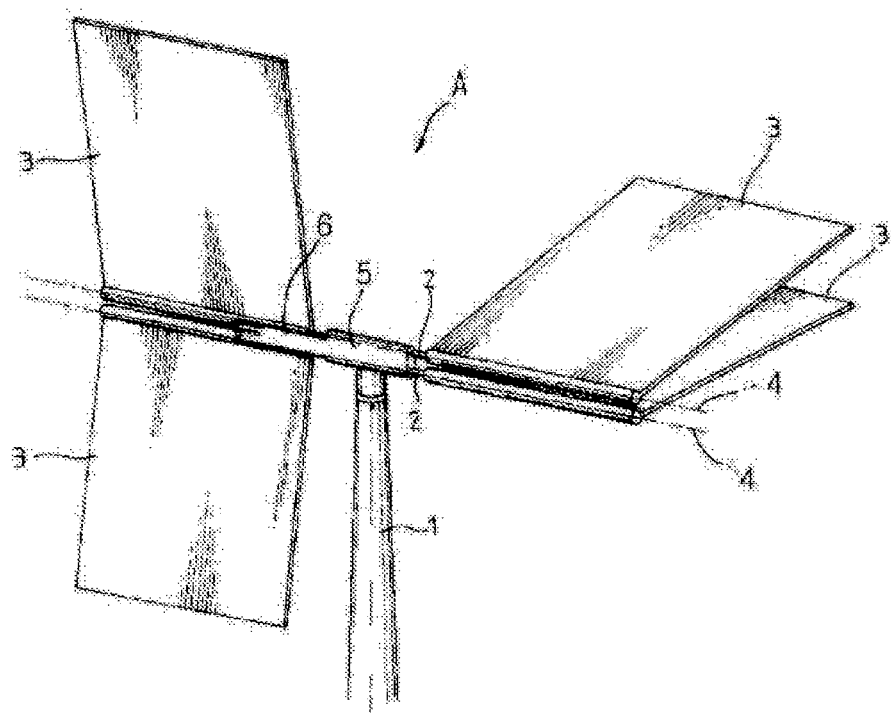
FIG. 2 is a perspective view of a propeller of a conventional wind power generator.

[Explanation of Reference Numerals for Major Portions Shown in Drawings]

| | |
|---|---|
| 10: Installation mount | 20: Vertical rotating shaft |
| 20': Bearing | 30: '['-shaped holder |
| 40: Inner wing installation unit | 40': Support rod |
| 40a, 40b, 40a', 40b': Installation unit | 41: Bolt |
| 42: Bolt | 50: Outer wing installation unit |
| 60: Support ring | 60': Vertical support rod |
| 70: Windmill wing | 71: Wing rotating shaft |
| 72: Wing part | 73: Wing spring |
| 80: Support unit | 80a, 80b: Support body |
| 81: Wire | 82: Bolt |
| 83: Circular projection portion | 84a, 84b: Support plate |
| 85: Bracket | 86: Bolt |
| 90: Power generation means | 90': Windmill wing fixing means |
| 91a, 91b, 91a', 91b': Moving unit | 92: Bolt |
| 93: Moving shaft | 94: Straight lever |
| 95: 'L'-shaped lever | 95a: Stopper pin |
| 96: Rotating shaft | 96a: Spring |
| 97: Lever | 100: Fixing means driving device |
| 101: Disk | 102: Spiral pipe |
| 103: Worm wheel | 104: Worm |
| 105: Motor | 106: Roller |
| A: Wind power generator | X: pillar |
| Y: wire | |

BEST MODE FOR INVENTION

Hereinafter, a wind power generator having variable windmill wings according to preferred embodiments of the present invention will be described in detail with reference to the accompanying drawings.

Figure 3:
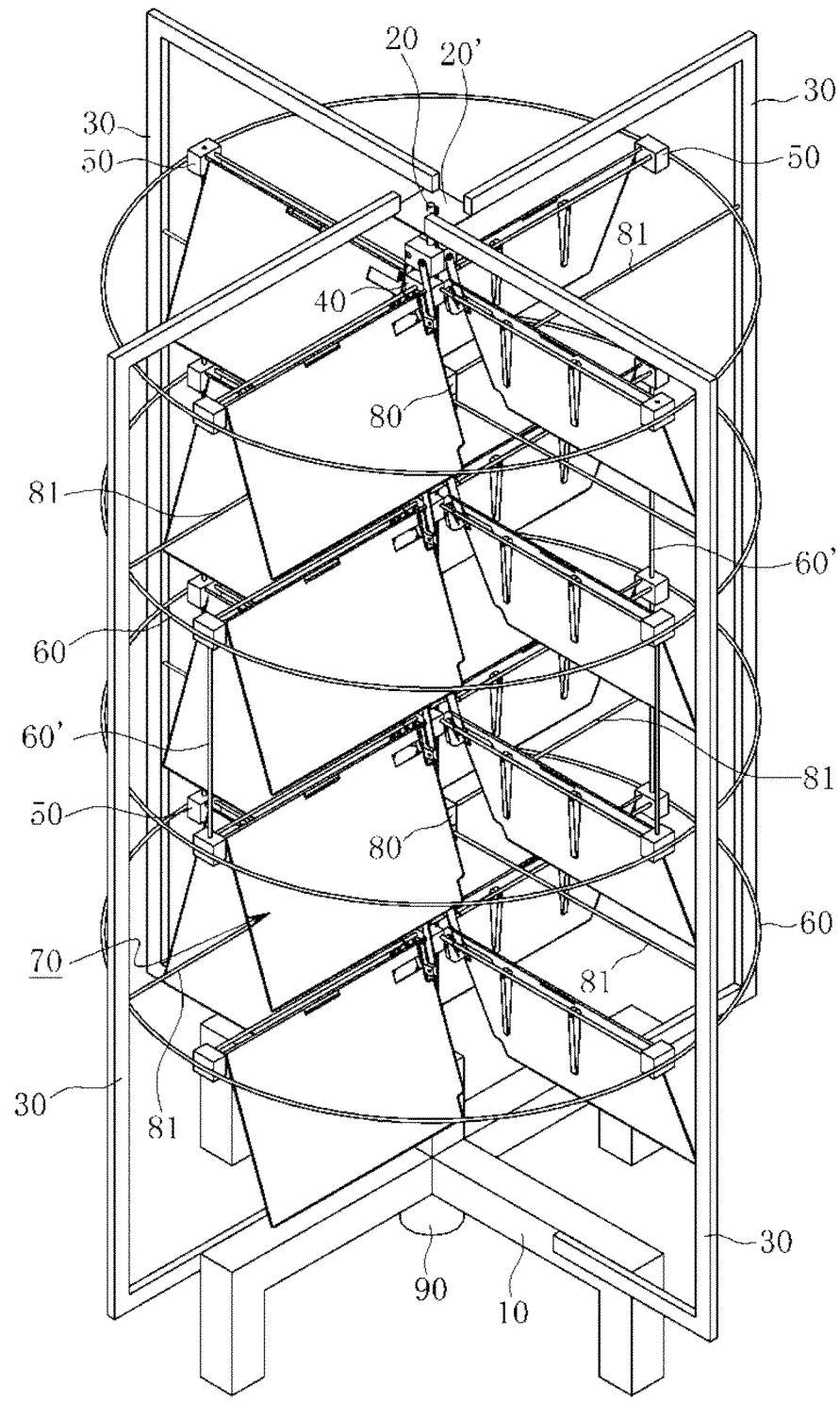
FIG. 3 is a perspective view of a wind power generator having variable windmill wings according to the present invention.
Figure 4A:
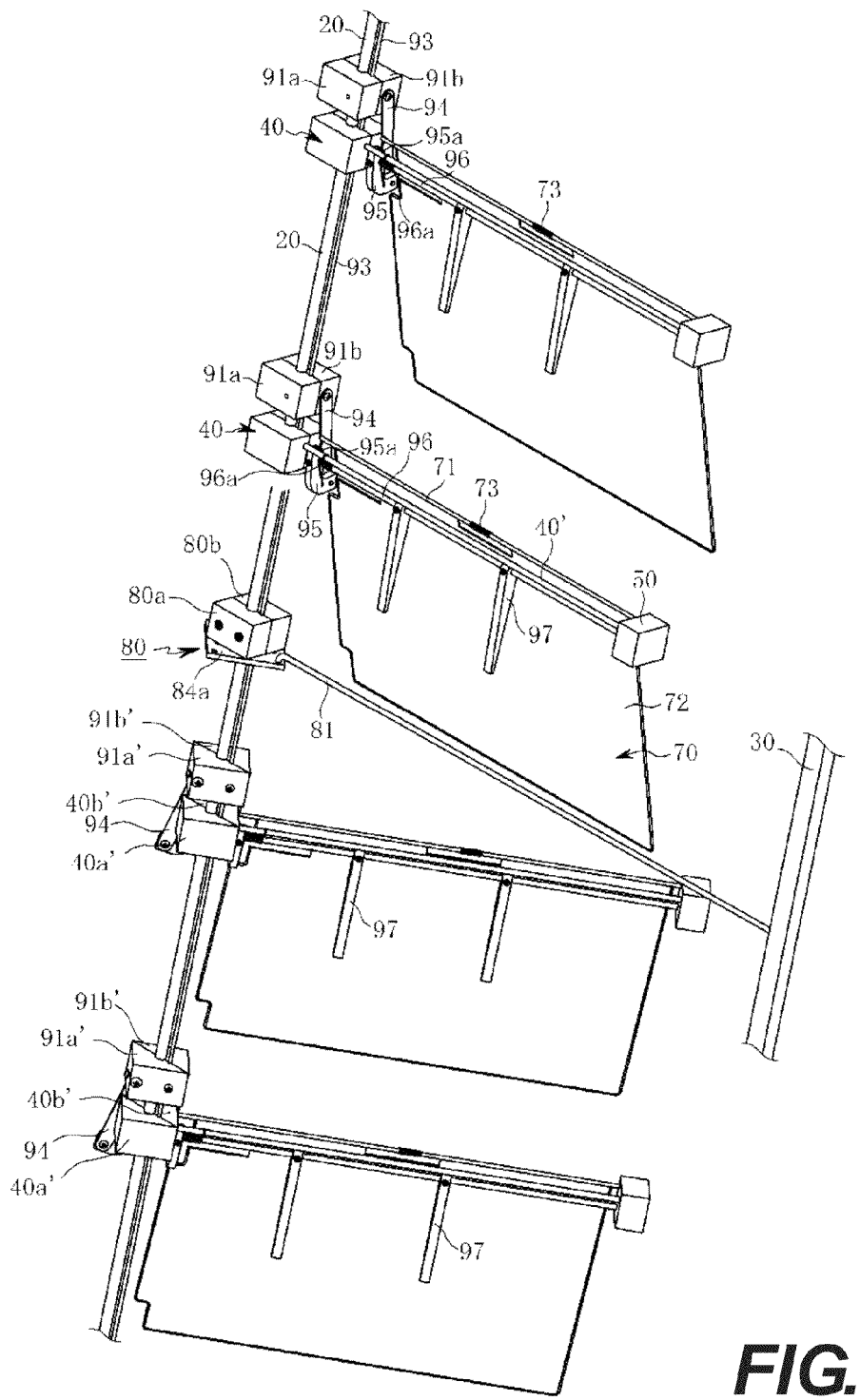
FIG. 4a is a perspective view illustrating an installation state of the windmill wings according to the present invention which are rotated in the clockwise direction.
Figure 4B:
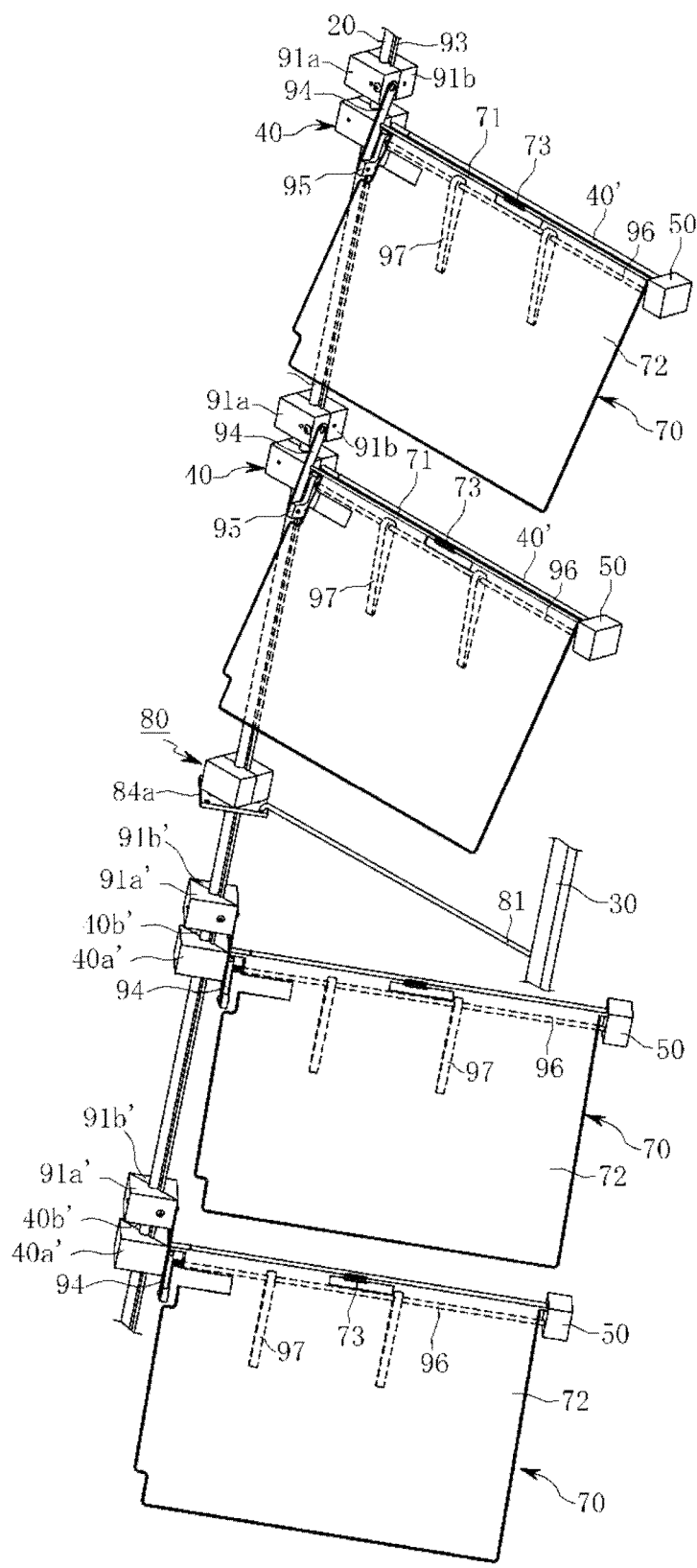
FIG. 4b is a perspective view illustrating an installation state of the windmill wings according to the present invention which are rotated in the counterclockwise direction.
Figure 5:
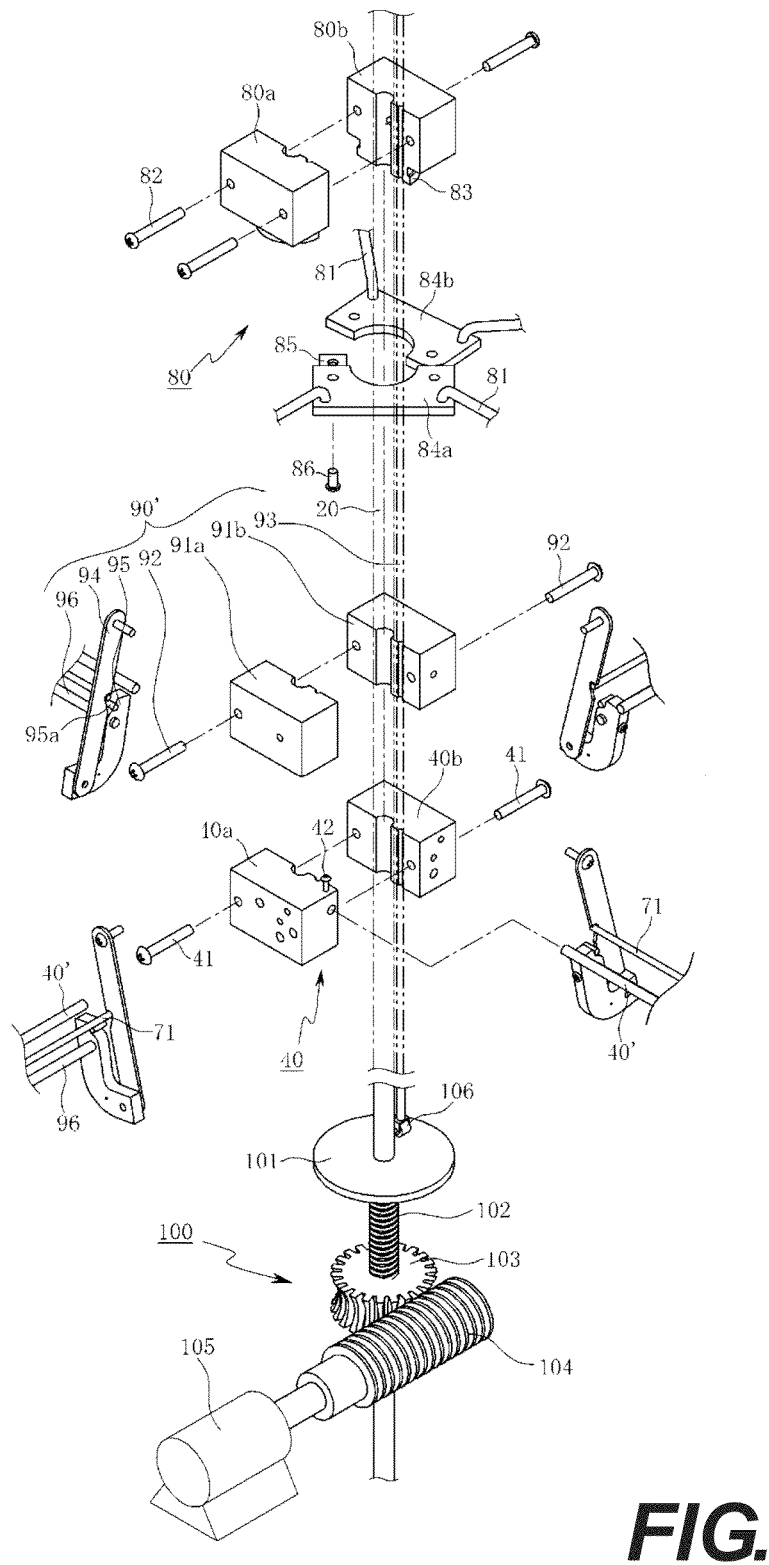
FIG. 5 is an exploded perspective view of major parts of the wind power generator having the variable windmill wings according to the present invention.
Figure 6A:
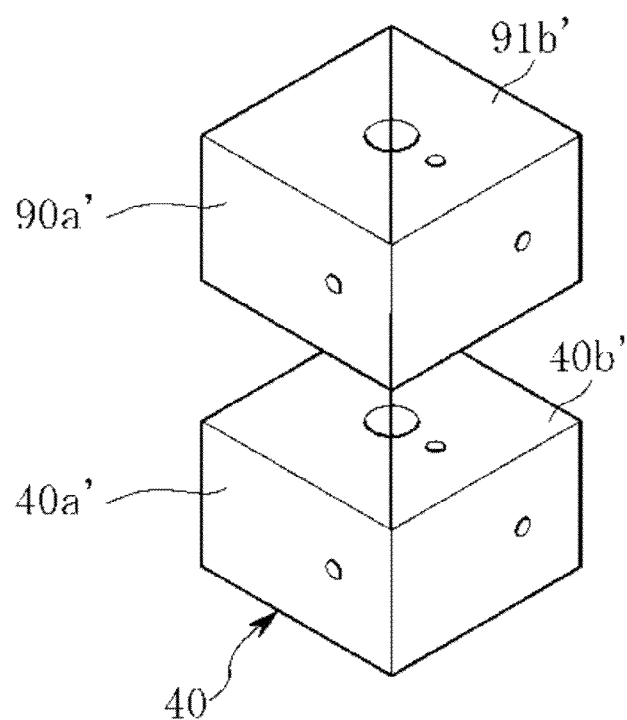
FIG. 6a is a perspective view of an inner wing installation unit and a moving unit according to another embodiment of the present invention.
Figure 6B:
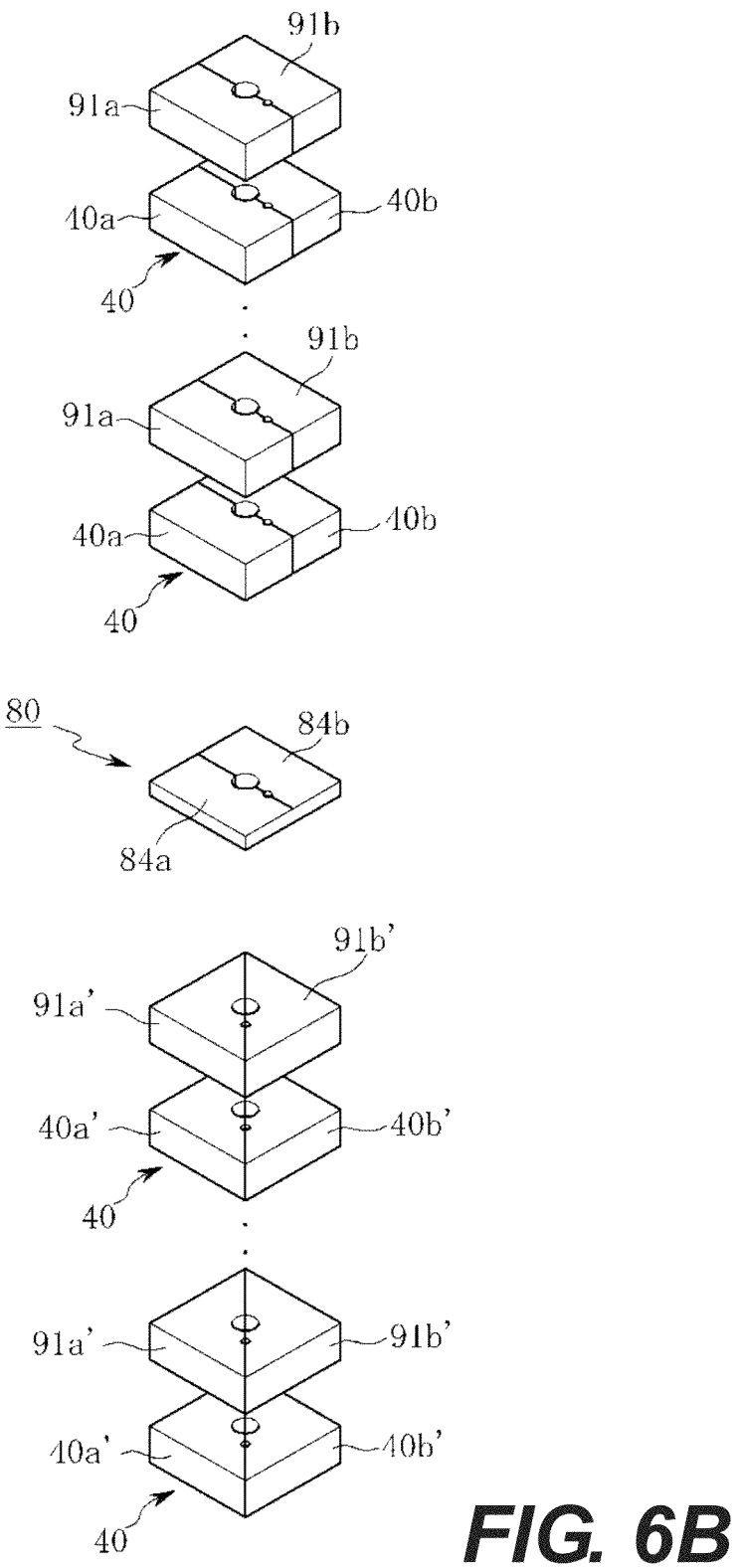
FIG. 6b is a view of a multi-stage arrangement state of inner wing installation units and moving units in each group of the windmill wings according to the present invention.
Figure 7A:
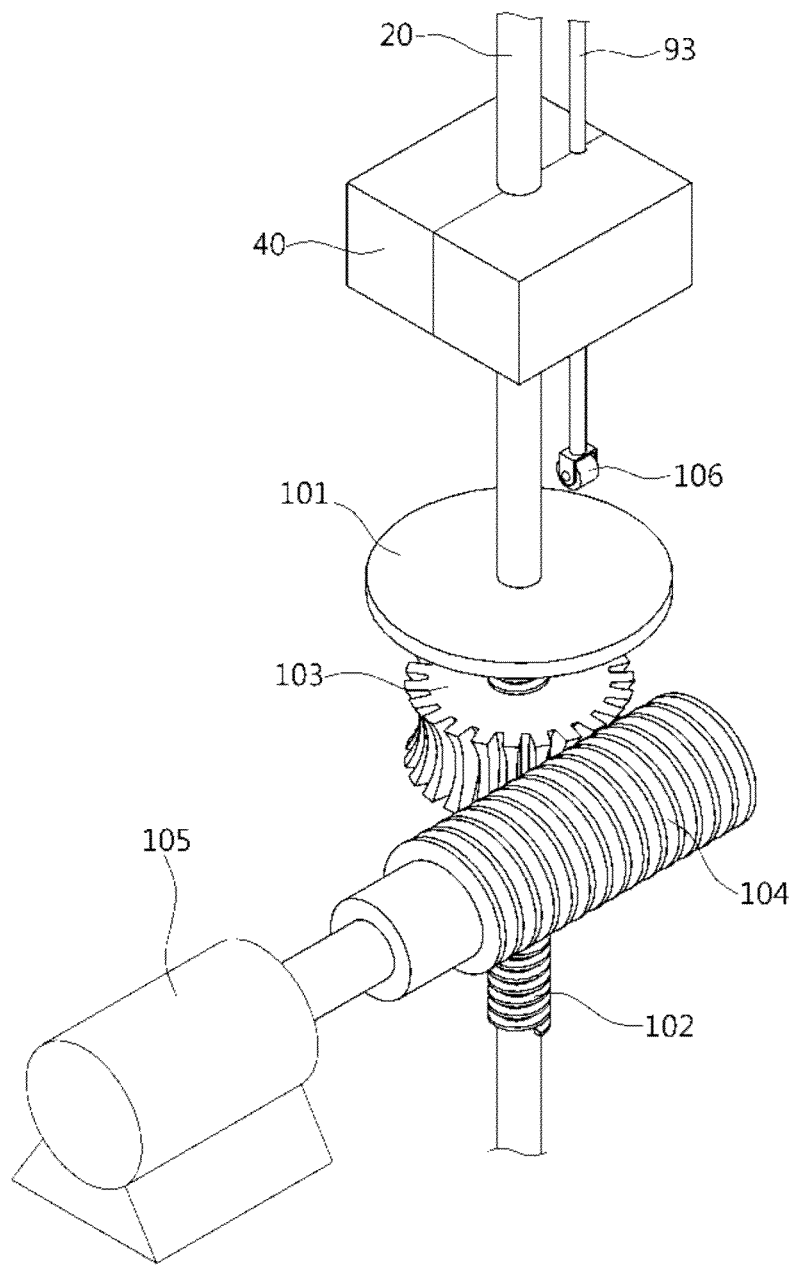
FIG. 7a is a view of a fixing means driving device according to the present invention, when the windmill wings rotate.
Figure 7B:
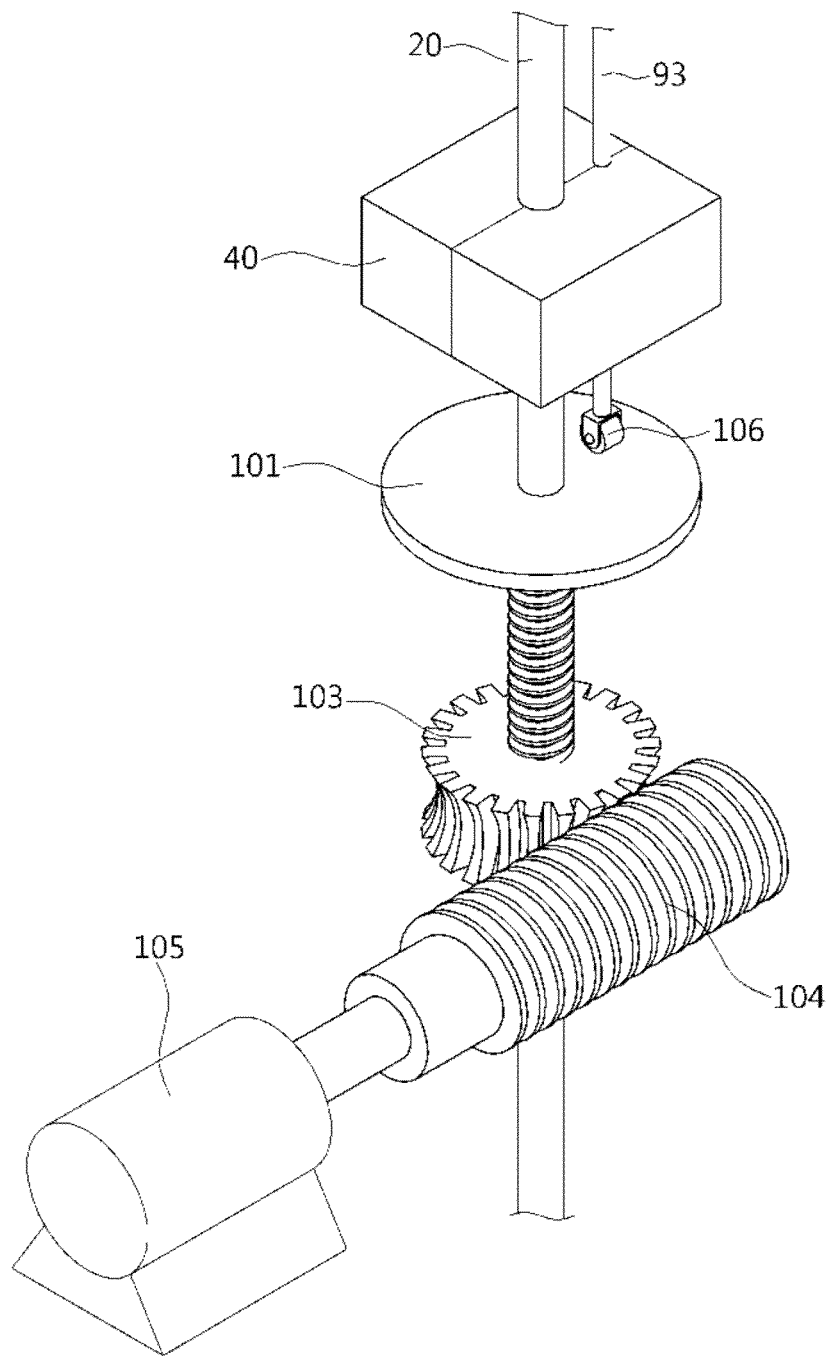
FIG. 7b is a view of the fixing means driving device according to the present invention, when the rotation of the windmill wings is stopped.
Figure 8A:
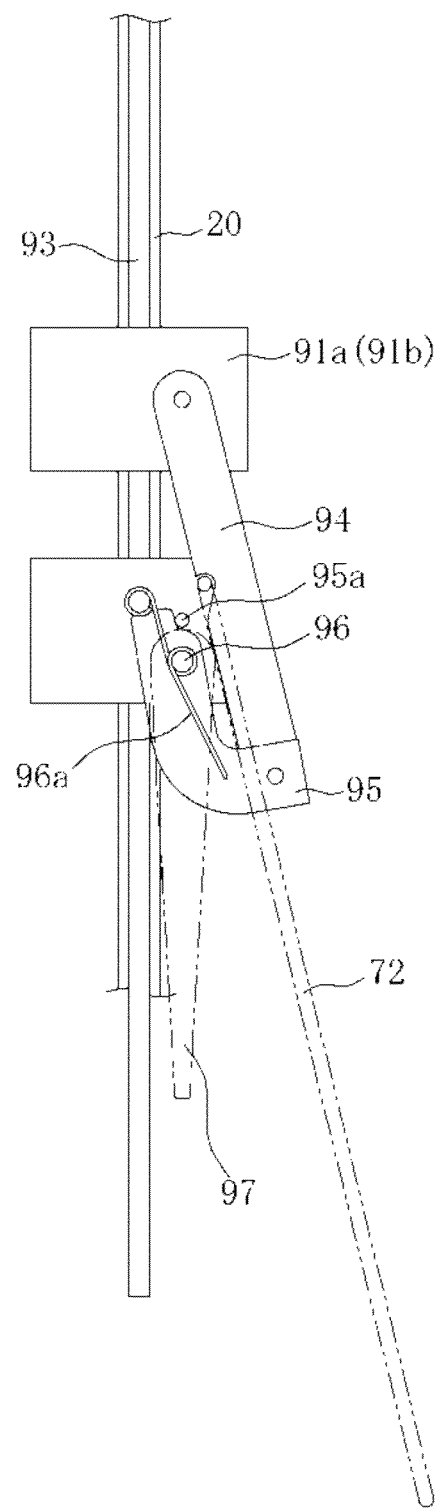
FIG. 8a is an explanatory view of an operating state of the windmill wing fixing means according to the present invention, when the windmill wings rotate.
Figure 8B:
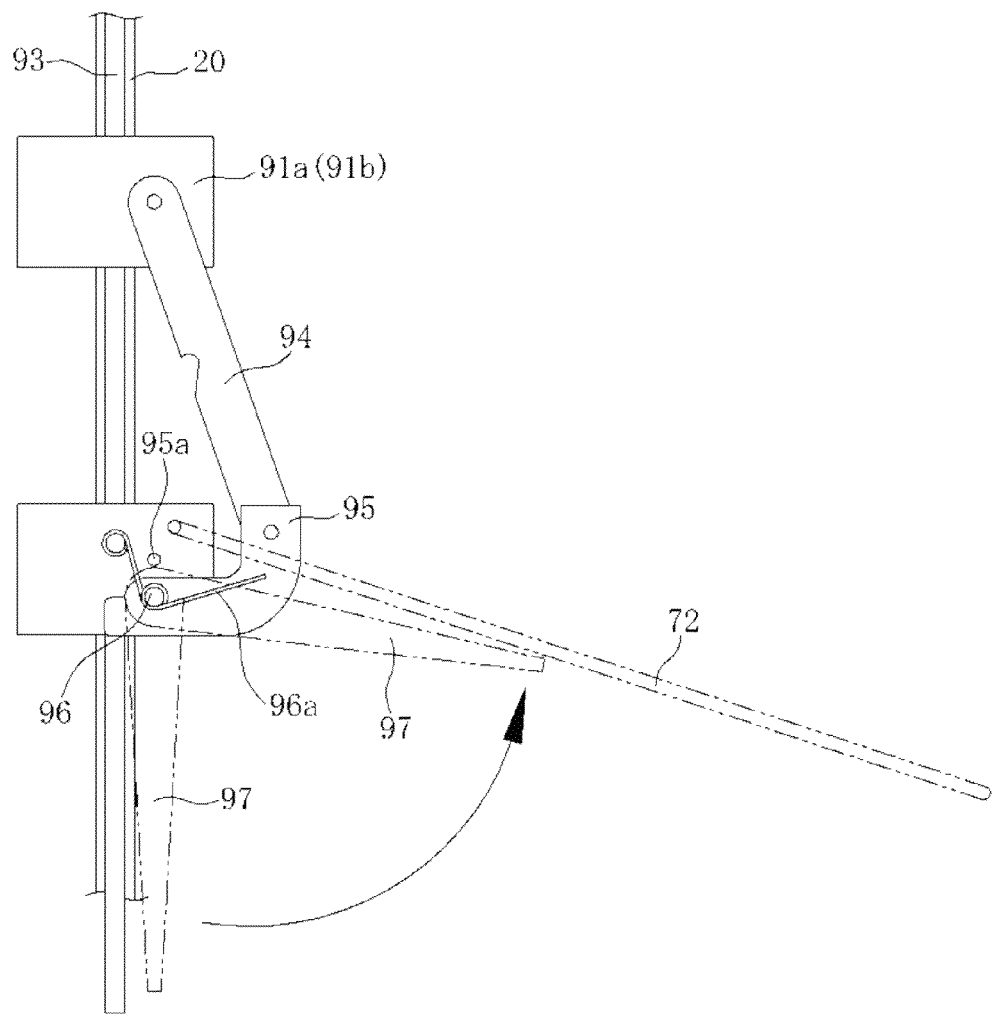
FIG. 8b is an explanatory view of an operating state of the windmill wing fixing means according to the present invention, when the rotation of the windmill wings is stopped.
Figure 9A:
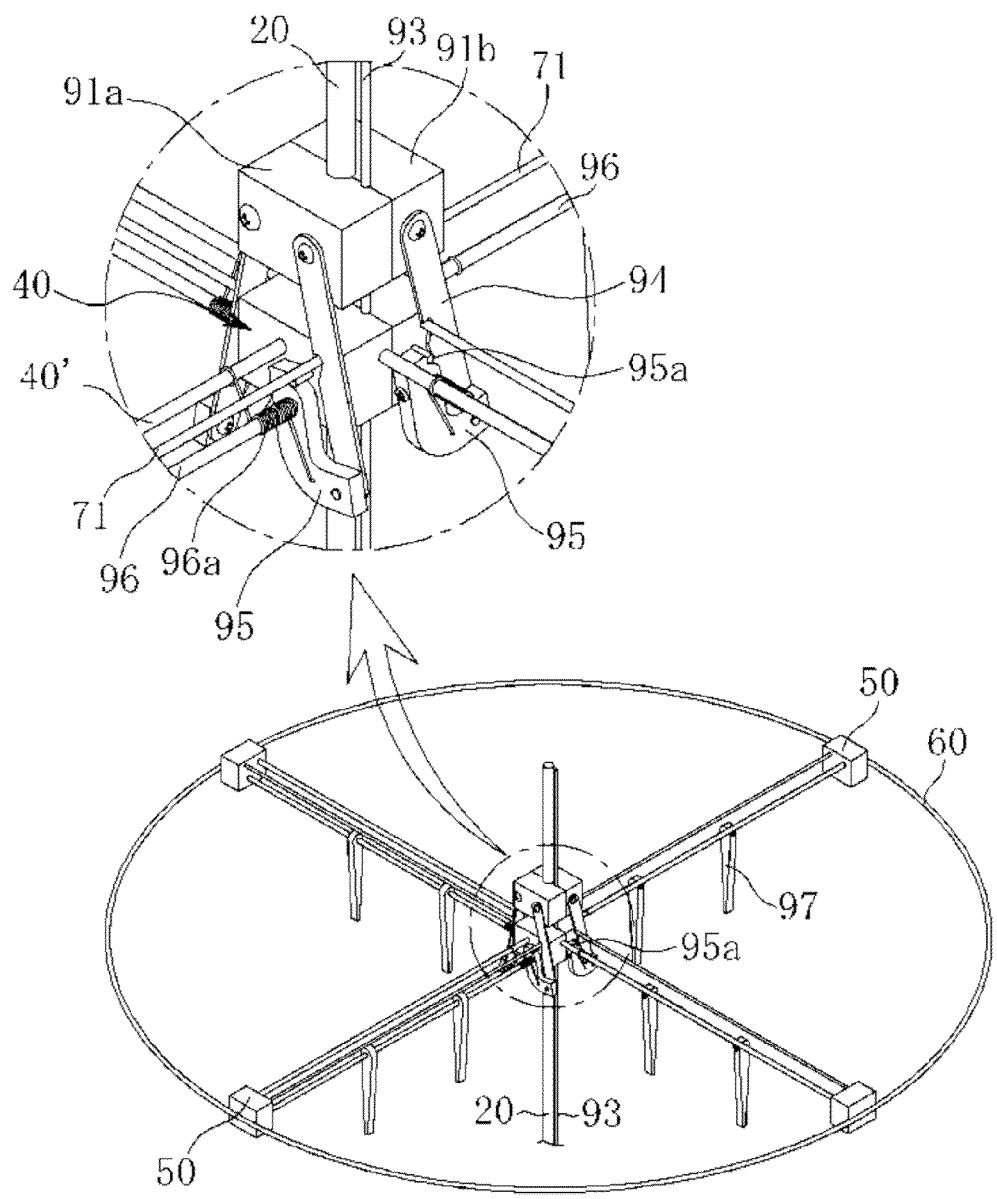
FIG. 9a is a view of an operating state of the windmill wing fixing means according to the present invention, when the windmill wings rotate.
Figure 9B:
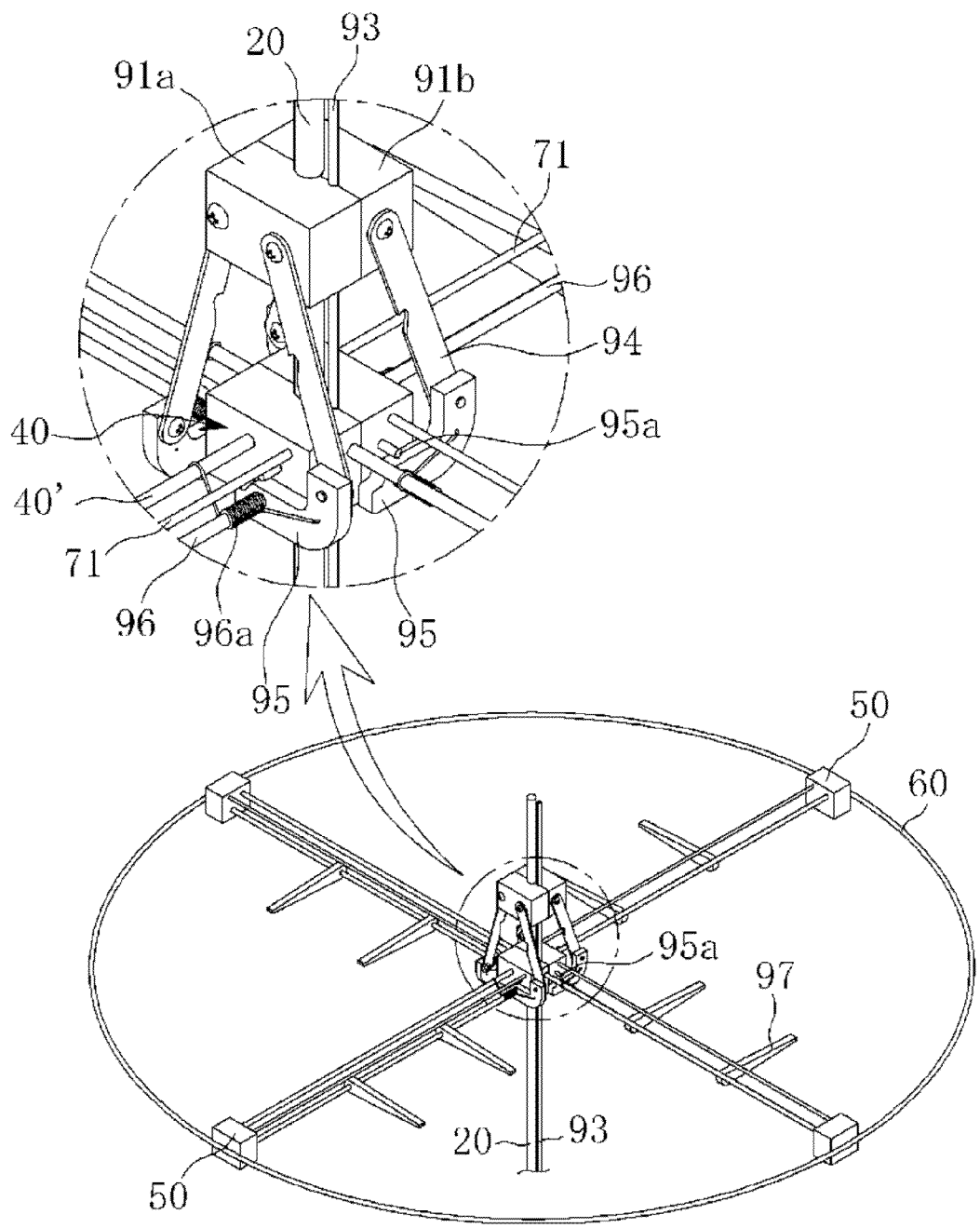
FIG. 9b is a view of an operating state of the windmill wing fixing means according to the present invention, when the rotation of the windmill wings is stopped.
Figure 10A:
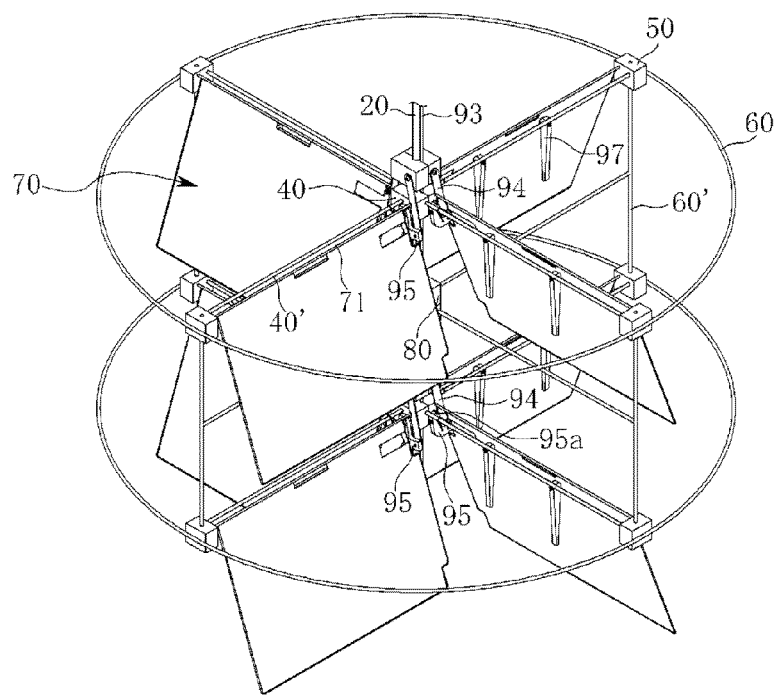
FIG. 10a is a view of a state of the windmill wings displaced by the operation of the windmill wing fixing means according to the present invention, when the windmill wings rotate.
Figure 10B:
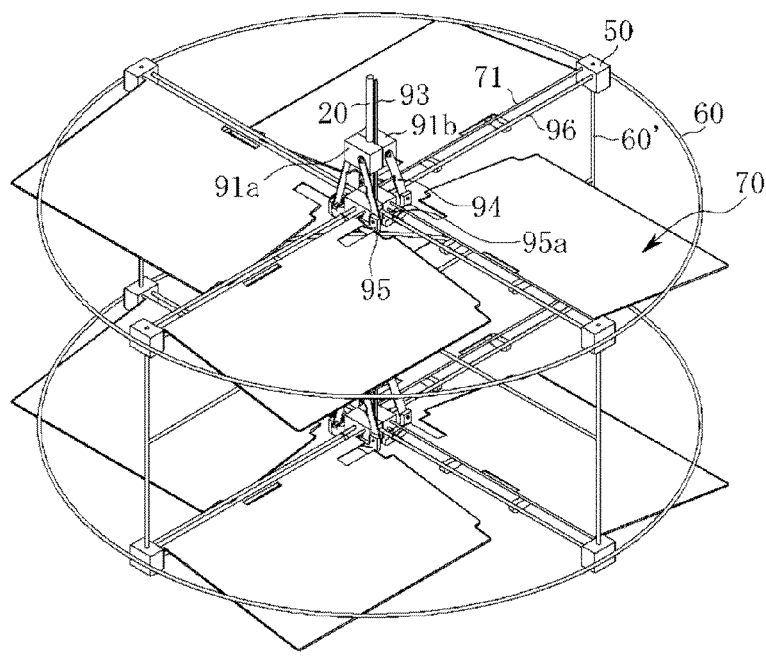
FIG. 10b is a view of a state of the windmill wings displaced by the operation of the windmill wing fixing means according to the present invention, when the rotation of the windmill wings is stopped.
Figure 11:
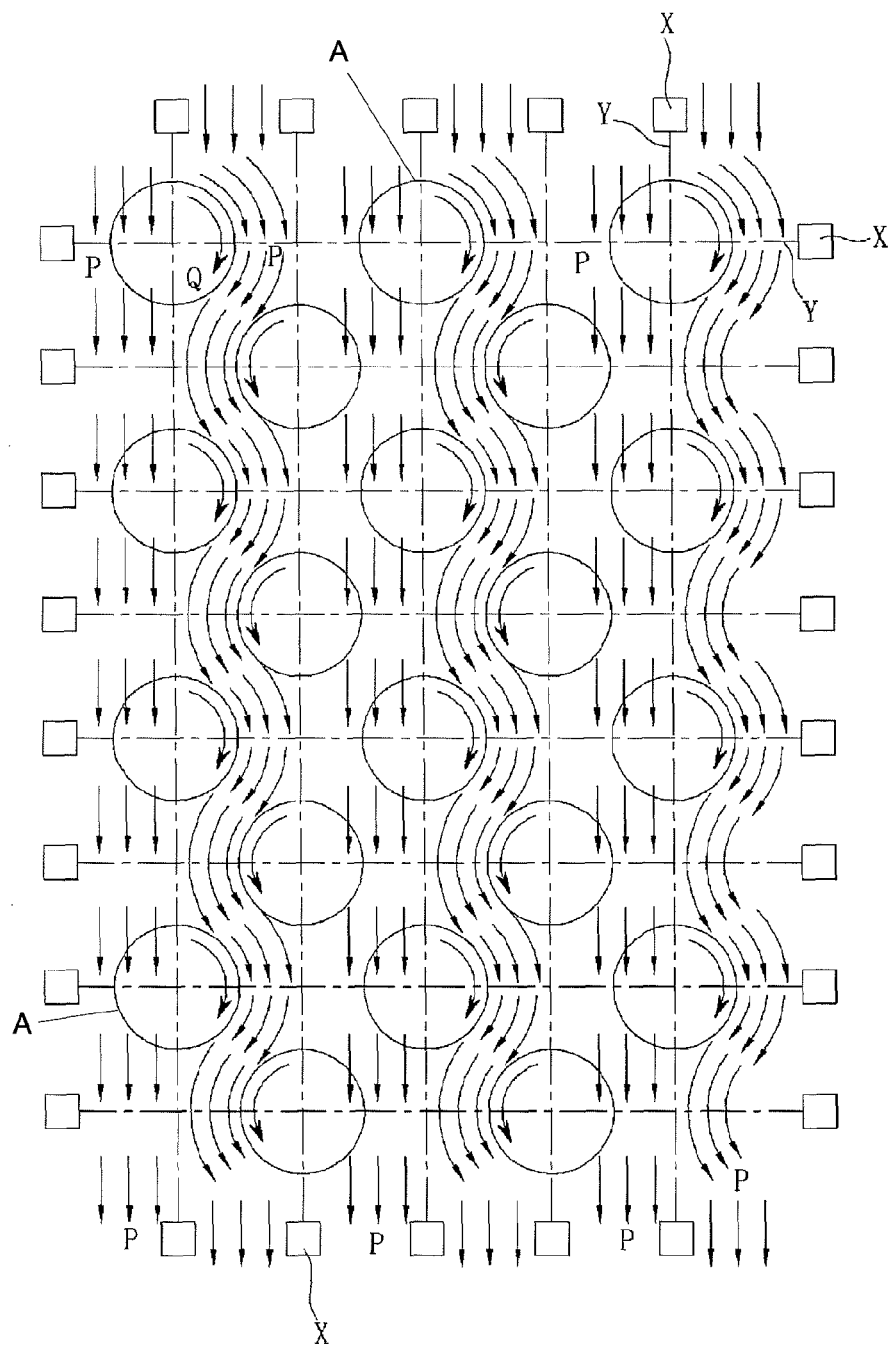
FIG. 11 is a schematic plan view of the flow of the wind between the windmill wings, when the wind power generator having the variable windmill wings according to the present invention is installed in a plural number.

FIG. 3 is a perspective view of a wind power generator having variable windmill wings according to the present invention, FIG. 4a is a perspective view illustrating an installation state of the windmill wings according to the present invention which are rotated in the clockwise direction, FIG. 4b is a perspective view illustrating an installation state of the windmill wings according to the present invention which are rotated in the counterclockwise direction, FIG. 5 is an exploded perspective view of major parts of the wind power generator having the variable windmill wings according to the present invention, FIG. 6a is a perspective view of an inner wing installation unit and a moving unit according to another embodiment of the present invention, FIG. 6b is a view of a multi-stage arrangement state of inner wing installation units and moving units in each group of the windmill wings according to the present invention, FIG. 7a is a view of a fixing means driving device according to the present invention, when the windmill wings rotate, FIG. 7b is a view of the fixing means driving device according to the present invention, when the rotation of the windmill wings is stopped, FIG. 8a is an explanatory view of an operating state of the windmill wing fixing means according to the present invention, when the windmill wings rotate, FIG. 8b is an explanatory view of an operating state of the windmill wing fixing means according to the present invention, when the rotation of the windmill wings is stopped, FIG. 9a is a view of an operating state of the windmill wing fixing means according to the present invention, when the windmill wings rotate, FIG. 9b is a view of an operating state of the windmill wing fixing means according to the present invention, when the rotation of the windmill wings is stopped, FIG. 10a is a view of a state of the windmill wings displaced by the operation of the windmill wing fixing means according to the present invention, when the windmill wings rotate, FIG. 10b is a view of a state of the windmill wings displaced by the operation of the windmill wing fixing means according to the present invention, when the rotation of the windmill wings is stopped, and FIG. 11 is a schematic plan view of the flow of the wind between the windmill wings, when the wind power generator having the variable windmill wings according to the present invention is installed in a plural number. A wind power generator A having variable windmill wings according to the present invention includes: an installation mount 10 stood on the floor in the shape of a cross (+) and having a vertical rotating shaft holder in a central portion thereof; a vertical rotating shaft 20 rotatably installed in the central portion of the installation mount 10; a bearing 20' into which a top end of the vertical rotating shaft 20 is rotatably inserted; '['-shaped holders 30 connected and fixed between the bearing 20' and the installation mount 10; a plurality of inner wing installation units 40 fixedly installed on the vertical rotating shaft 20 at given intervals in the up/down direction; support rods 40' having one-side ends fixed to the inner wing installation units 40; a plurality of outer wing installation units 50 to which outer ends of the support rods 40' are fixed; support rings 60 made of a steel wire and connected to the outer wing installation units 50 on the same plane; vertical support rods 60' made of a steel wire and connecting the outer wing installation units 50 of the same group in the up/down direction, the upper and lower outer wing installation units 50 being grouped in the up/down multi-stage fashion; windmill wings 70 installed between the inner wing installation units 40 and the outer wing installation units 50 in the up/down multi-stage fashion; support units 80 installed on the vertical rotating shaft 20 between the groups of the windmill wings 70 made in the up/down multi-stage fashion, and connected to the '['-shaped holders 30 through wires 81; power generation means 90 installed on the bottom surface of the central portion of the installation mount 10; windmill wing fixing means 90' installed on the vertical rotating shaft 20 above the inner wing installation units 40 to be movable in the up/down direction and fixing displacements of the windmill wings 70; and a fixing means driving device 100 installed on the bottom end side of the vertical rotating shaft 20.

Each of the inner wing installation units 40 is divided into an installation unit 40a and an installation unit 40b, which are coupled to each other by a bolt 41, one ends of the support rods 40' are inserted into the inner wing installation unit 40 in the horizontal direction from the front, rear, left and right directions and fixed thereto by a bolt 42 downwardly inserted from the top surface, one ends of wing rotating shafts 71 are rotatably inserted into the inner wing installation units 40 on the same plane as the support rods 40', one ends of rotating shafts 96 of the windmill wing fixing means 90' are rotatably inserted into the inner wing installation units 40 below the inserted portions of the support rods 40' and the wing rotating shafts 71, the other ends of the support rods 40' are inserted into and fixed to the outer wing installation units 50, and the respective other ends of the wing rotating shafts 71 and the rotating shafts 96 are rotatably inserted into the outer wing installation units 50.

Each of the windmill wings 70 includes a wing rotating shaft 71 rotatably installed between the inner wing installation unit 40 and the outer wing installation unit 50 on the same plane as the support rod 40', a wing part 72 having one side fixed to the wing rotating shaft 71, and a wing spring 73 inserted into a central portion of the wing rotating shaft 71 and maintaining the wing part 72 at 45° from the horizontal surface during non-operation.

Here, the wing parts 72 are preferably made of a material having a light weight and a high intensity, and thus made of any one selected from the group consisting of transparent or opaque reinforced plastic, strengthened glass, non-ferrous metal, and duralumin.

The inner wing installation units 40 are divided into a structure in which the cutting side of the central portion for dividing the installation unit 40 into the installation unit 40a and the installation unit 40b is parallel to the outer side as shown in FIG. 5 and a structure in which the cutting side for dividing the installation unit 40 into the installation unit 40a' and the installation unit 40b' is diagonal as shown in FIG. 6a. In addition, the moving units are divided into a structure in which the cutting side of the central portion for dividing the moving unit into the moving unit 91a and the moving unit 91b is parallel to the outer side as shown in FIG. 5 and a structure in which the cutting side for dividing the moving unit into the moving unit 91a' and the moving unit 91b' is diagonal as shown in FIG. 6a. Referring to FIG. 6b, the installation units and the moving units are alternately installed so that the groups located over the support units 80 can be the groups in which the cutting surfaces are parallel to the outer side and the groups located below the support units 80 can be the groups in which the cutting surfaces are diagonal (or so that the groups located over the support units 80 can be the groups in which the cutting surfaces are diagonal and the groups located below the support units 80 can be the groups in which the cutting surfaces are parallel to the outer side). Therefore, the wing part 72 of one group which corresponds to the wing part 72 receiving the wind in the vertical direction among the wing parts 72 of the windmill wings 70 of the other group is more or less rotated than the wing part 72 receiving the wind in the vertical direction by 45°. In each group, whenever the wing rotating shafts 71 of the windmill wings 70 are rotated by 90°, the wing parts 72 receive the wind in the vertical direction. However, in terms of the entire groups, whenever the wing rotating shafts 71 are rotated by 45°, the wing parts 72 of the groups alternately receive the wind in the vertical direction, which brings about high efficiency wind power generation.

Moreover, each of the support units 80 is divided into a support body 80a and a support body 80b, which are coupled to each other by a bolt 82, support plates are inserted into bottom circular projection portions 83 formed by the coupling of the support body 80a and the support body 80b, each of the support plates is divided into a support plate 84a and a support plate 84b so that one support plate forms a hinge structure and the other support plate is coupled to a bolt 86 through the medium of a bracket 85, one ends of the wires 81 are fixed to four edges of the coupled support plates 84a and 84b, and the other ends of the wires 81 are connected and fixed to the '['-shaped support rods 30.

Each of the windmill wing fixing means 90' is divided into the moving unit 91a and the moving unit 91b, which are coupled to each other by a bolt 92 so that the moving unit 91a and the moving unit 91b can move in the up/down direction with the vertical rotating shaft 20 inserted into a central portion thereof, a moving shaft 93 for moving the moving unit 91a and the moving unit 91b in the up/down direction is inserted and fixed between the moving unit 91a and the moving unit 91b, one ends of straight levers 94 are fixed to outer surfaces of the coupled moving units 91a and 91b, respectively, one ends of 'L'-shaped levers 95 are rotatably connected to the other ends of the straight levers 94, rotating shafts 96 provided with springs 96a are inserted into the other ends of the 'L'-shaped levers 95 and rotatably inserted into the inner wing installation units 40, stopper pins 95a for stopping rotation of the 'L'-shaped levers 95 are inserted into and fixed to the inner wing installation units 40 on which the other ends of the 'L'-shaped levers 95 are located, the springs 95a have one ends mounted on and fixed to the support rods 40' and the other ends fixed on the 'L'-shaped levers 95 adjacent to the connection portions of the straight levers 94 and the 'L'-shaped levers 95, and a plurality of levers 97 are fixed on the rotating shafts 96 at given intervals.

Meanwhile, the fixing means driving device 100 includes: a disk 101 having the vertical rotating shaft 20 inserted into a central portion thereof, rotating on the vertical rotating shaft 20, and moving in the up/down direction; a spiral pipe 102 fitted around the vertical rotating shaft 20 to be movable in the up/down direction, having a top end fixed to a bottom surface of the disk 101, and having an outer circumferential portion spirally formed and screw-coupled to a central portion of a worm wheel; the worm wheel 103 having the central portion tooth-combined with the spiral pipe 102; a worm 104 tooth-combined with the outer circumference of the worm wheel 104; a motor 105 connected to a shaft of the worm 104; and a roller 106 installed at a bottom end of the moving shaft 93.

The reason for dividing the support unit 80 into the support body 80a and the support body 80b, the support plate into the support plate 84a and the support plate 84b, the windmill wing fixing means 90' into the moving unit 91a and the moving unit 91b or the moving unit 91a' and the moving unit 91b', and the inner wing installation unit 40 into the installation unit 40a and the installation unit 40b or the installation unit 40a' and the installation unit 40b' is because a corresponding broken part can be easily replaced and repaired in the event of a failure.

Here, preferably, so as to increase the generated power, the windmill wings 70 are installed in the up/down n-stages, the wind power generator A having the up/down n-stage windmill wings 70 is installed in a plural number in the front/rear and left/right horizontal directions, and the power generation means 90 of the respective wind power generators A are electrically connected to each other, so that power generated by each power generation means 90 is combined.

In addition, when the plurality of wind power generators A having the up/down n-stage windmill wings 70 are installed in the front/rear and left/right horizontal directions, as illustrated in FIG. 11, although a plurality of pillars X are vertically installed on front/rear and left/right outer portions, and connected and fixed to the bearing portions 20' of the respective wind power generators A by wires Y, the wind power generators A do not hide the sunlight. Accordingly, the wind power generator A can be installed on a building, farmland, forest land, or marine farm, and thus is not limited in the installation location.

Next, the operation of the wind power generator having the variable wings with the above-described construction according to the present invention will be described in detail.

In the wind power generator A according to the present invention, the windmill wings 70 opposite to the wind blowing direction are pushed by the blowing wind, so that the wing parts 72 are suspended on the levers 97, receive the wind in the vertical state, and thus push the support rods 40'. Therefore, the wing parts 72 receiving the wind rotate the vertical rotating shaft 20 through the wing rotating shafts 71, thereby generating power.

Here, as the wing parts 72 rotated upon the rotation of the vertical rotating shaft 20 by 90° from the vertical surface orthogonal to the direction of the wind rotate again, the wing parts 72 are lifted to the horizontal state due to the resistance force of the air, and thus do not receive the resistance of the air. As the vertical rotating shaft 20 rotates, the wing parts 72 rotate again. The wing parts 72 rotated by 270° from the vertical surface orthogonal to the direction of the wind rotate again, and thus maintain 45° from a horizontal surface by the wing spring 73. In this situation, if the wing parts 72 rotate again, they are pushed again by the blowing wind, suspended on the levers 97, receive the wind in the vertical state, and push the wing rotating shafts 71, so that the vertical rotating shaft 20 is continuously rotated to generate power.

The operation of the windmill wings 70 described above can be accomplished in that the wing parts 72 receiving the wind are suspended on the levers 97 in the front/rear direction (see FIGS. 4a and 4b) and are horizontal with respect to the ground in the opposite side after 180° rotation.

FIG. 11 is a schematic plan view of the flow of the wind between the windmill wings, when the wind power generator A having the variable windmill wings according to the present invention is installed in a plural number.

In FIG. 11, arrows P indicate the wind blowing directions and arrows Q indicate the rotation directions of the respective wind power generators A. The wind power generators A of the first column are rotated in the clockwise direction and the wind power generators A of the second column are rotated in the counterclockwise direction. In addition, the wind power generators A of the third column are rotated in the clockwise direction and the wind power generators A of the fourth column are rotated in the counterclockwise direction. In this way, the wind power generators A of the respective columns are alternately rotated in opposite directions.

Here, the wind blowing into a wide region gets stronger through narrow regions such as between the wind power generators A of the first column and the wind power generators A of the second column and between the wind power generators A of the third column and the wind power generators A of the fourth column, so that the power generation efficiency of the wind power generators A increases. In this case, even if the wind blows in the front/rear, left/right or diagonal direction, the wind power generators A make a pair by two columns, so that the wind power generators A of one column are rotated in the clockwise direction and the wind power generators A of the other column are rotated in the counterclockwise direction to generate power.

The rotation directions of the wind power generators A as described above can be accomplished in that each column selectively employs the structure in which the wing parts 72 are suspended on the front levers 97 in the rear (see FIG. 4a) and the structure in which the wing parts 72 are suspended on the rear levers 97 in the front (see FIG. 4b). That is, the wind power generators A having the windmill wings 70 as shown in FIG. 4a are rotated in the clockwise direction and the wind power generators A having the windmill wings 70 as shown in FIG. 4b are rotated in the counterclockwise direction.

In the wind power generator A having the variable windmill wings according to the present invention which performs the wind power generation as described above, as illustrated in FIGS. 7a, 8a, 9a, and 10a, in a state where the windmill wing fixing means 90' do not operate, the levers 97 have a vertical downward state to maintain the windmill wings 70 receiving the wind to be in the vertical state, so that the windmill wings 70 operate in the normal state and generate power. If it is necessary to protect the wind power generator A from the storm or to mend, manage and repair the wind power generator A, in order to stop the operation of the wind power generator A, the fixing means driving device 100 is operated as shown in FIG. 7b, thus upwardly moving the moving shaft 93 of the windmill wing fixing means 90' as shown in FIGS. 8b, 9b, and 10b. That is, when the motor 105 is rotated in the normal direction, the worm 104 and the worm wheel 103 are rotated, the spiral pipe 102 is rotated in the clockwise direction and lifted, and the disk 101 is rotated in the clockwise direction and lifted, so that the lifted disk 101 upwardly moves the moving shaft 93.

Accordingly, the moving units 91a and 91b fixed to the moving shaft 93 are lifted along the vertical rotating shaft 20, and thus the straight levers 94 are lifted, upwardly pulling the 'L'-shaped levers 95. The rotating shafts 96 are rotated, so that the levers 97 lift the wing parts 72 of the windmill wings 70. Thus, the wing parts 72 of the entire windmill wings 70 maintain the horizontal state with respect to the ground not to receive the blowing wind (the state of FIGS. 8b, 9b and 10b) and the rotation of the vertical rotating shaft 20 is stopped. In this situation, the wind power generator A can be mended, managed and repaired.

Here, differently from the case in which the operation of the wind power generator A is stopped by upwardly moving the moving shaft 93 completely, the angle of the vertical surface to the wing parts 72 of the windmill wings 70 can be set according to the degree of upwardly moving the moving shaft 93. In the event of a storm, the moving shaft 93 is upwardly moved and fixed in advance according to the predicted intensity of the storm, so that the wing parts 72 do not receive the entire wind, but make some of the wind pass by. As a result, the wind power generator A can be protected from the storm.

Moreover, in order to lower and return the lifted moving shaft 93, the motor 105 is rotated in the reverse direction. That is, when the motor 105 is rotated in the reverse direction, the worm 104 and the worm wheel 103 are rotated, the spiral pipe 102 is rotated in the counterclockwise direction and lowered, and the disk 101 is rotated in the counterclockwise direction and lowered.

Therefore, the moving shaft 93 is lowered until the ends of the 'L'-shaped levers 95 are suspended on the stopper pins 95a to prevent rotation (the vertical downward state of the levers 97), so that the wind power generator A reaches the state shown in FIGS. 7a, 8a, 9a, and 10a, i.e., the normal power generation state.

While the present invention has been illustrated and described in connection with the preferred embodiments, the present invention is not limited thereto. Accordingly, it will be understood by those skilled in the art that various modifications and changes can be made thereto without departing from the spirit and scope of the invention defined by the appended claims.

The invention claimed is:

1. A wind power generator, comprising:
a base;
a central shaft rotatably connected to the base, the shaft extending upwardly from the base;
a power generator for converting rotational movement of the central shaft into electrical power;
a plurality of wing rotating shafts extending from the central shaft;
a wind mill wing attached to each of the wing rotating shafts;
an inner wing installation unit connecting each wing rotating shaft to the central shaft, each wing rotating shaft rotatably connected to the inner wing installation unit;
a plurality of rotating shafts rotatably connected to and extending from the inner wing installation unit;
at least one lever extending downwardly from each rotating shaft;
a moving unit attached to the central shaft, the moving unit located above the inner wing installation unit, the moving unit movable relative to the inner wing installation unit;
a first lever attached to each rotating shaft; and
a second lever having one end pivotally attached to the first lever and a second end attached to the moving unit,
wherein upward movement of the moving unit relative to the inner wing installation unit causes the first and second levers to rotate the rotating shaft, and
wherein rotation of the rotating shaft causes the at least one lever on the rotating shaft to contact and rotate the wind mill wing.

2. The wind power generator of claim 1, further comprising:
a plurality of support rods extending from the inner wing installation unit; and
a spring extending between each support rod and each rotating shaft.

3. The wind power generator of claim 2, further comprising:
a plurality of outer wing installation units, each outer wing installation unit having a wing rotating shaft, a rotating shaft and a support rod connected thereto.

4. The wind power generator of claim 1, further comprising:
a plurality of external supports, each external support comprising:
a first section extending outwardly from the base;
a second section extending upwardly from the first section; and
a third section extending from the second section to a top of the central shaft;
a plurality of support rings extending between the external supports; and
a plurality of wires extending radially outwardly from the central shaft to the external supports.

5. The wind power generator of claim 1, further comprising:
a worm wheel;
a spiral pipe having a threaded portion, the spiral pipe extending upwardly through the worm wheel;
a disk attached to the spiral pipe above the threaded portion;
a moving shaft extending upwardly from the disk and connected to the moving unit;
a worm engaging an outer periphery of the worm gear; and
a motor driving the worm gear,
wherein rotation of the worm wheel by the worm causes movement of the spiral pipe relative to the worm wheel,
wherein upward movement of the spiral pipe causes the disk to move the moving shaft upwardly, and wherein upward movement of the moving shaft causes upward movement of the moving unit.

6. The wind power generator of claim 1, wherein the inner wing installation unit and moving unit are each formed by two halves fastened together.

7. The wind power generator of claim 1, further comprising:
a plurality of inner wing installation units spaced along the central shaft, each inner wing installation unit having a plurality of wing rotating shafts extending therefrom.

8. The wind power generator of claim 1, further comprising:
a plurality of levers extending downwardly from each rotating shaft.

* * * * *